(12) United States Patent
Martin et al.

(10) Patent No.: US 6,789,691 B2
(45) Date of Patent: Sep. 14, 2004

(54) SEALABLE CASING HAVING A QUARTER-TURN CLOSING ARRANGEMENT

(75) Inventors: Michel Jean Martin, Saint-Germain les Arpajon (FR); Philippe Roger Rouix, Vaires s/Marne (FR)

(73) Assignee: Snecma Moteurs, Paris (FR)

( * ) Notice: Subject to any disclaimer, the term of this patent is extended or adjusted under 35 U.S.C. 154(b) by 26 days.

(21) Appl. No.: 10/084,931

(22) Filed: Mar. 1, 2002

(65) Prior Publication Data

US 2002/0121519 A1 Sep. 5, 2002

(30) Foreign Application Priority Data

Mar. 1, 2001 (FR) .............................. 01 02779

(51) Int. Cl.[7] .............................................. B65D 41/06
(52) U.S. Cl. ....................... 220/296; 220/298; 220/323; 220/304; 220/281; 292/57
(58) Field of Search ........................... 220/254.1, 254.8, 220/281, 293, 296, 298, 323, 304, 256.1, 255, DIG. 32, 203.04, 203.05, 203.06, 203.07, 231, 254.2, 254.3, 254.5, 254.6; 215/330, 331, 217, 357; 292/57, 58, DIG. 37

(56) References Cited

U.S. PATENT DOCUMENTS

| | | | | |
|---|---|---|---|---|
| 1,351,496 A | * | 8/1920 | Spooner | ..................... 215/329 |
| 3,237,802 A | * | 3/1966 | Wagner | ...................... 206/508 |
| 3,659,735 A | * | 5/1972 | Landen | ........................ 215/222 |
| 3,741,421 A | * | 6/1973 | Wittwer | ...................... 215/217 |
| 3,860,136 A | | 1/1975 | Romney | |
| 4,495,072 A | | 1/1985 | Fields | |
| 4,552,283 A | * | 11/1985 | Poldner | ...................... 220/304 |
| 5,325,981 A | | 7/1994 | Klomhaus et al. | |
| 5,927,531 A | * | 7/1999 | Kuzma et al. | .............. 215/321 |
| 6,502,534 B2 | * | 1/2003 | Feyerl et al. | ............. 123/90.11 |

FOREIGN PATENT DOCUMENTS

| | | | | |
|---|---|---|---|---|
| EP | 0 415 890 | * | 3/1991 | ................. 220/298 |
| EP | 0580501 | | 1/1994 | |
| FR | 2662427 | | 11/1991 | |

* cited by examiner

Primary Examiner—Robin A. Hylton
(74) Attorney, Agent, or Firm—Bacon & Thomas, PLLC

(57) ABSTRACT

A sealable casing having a quarter-turn closing arrangement including a tubular body defining an orifice at one end having radially projecting arcuate members and clearances formed along an inner periphery thereof. The casing further includes a cap having radially projecting arcuate members and clearances formed along its inner periphery that are complementary to arcuate members and clearances of the tubular body. A hoop member is connected to the cap and includes a plurality of extensions that are biased by at least one resilient member connected to the cap so as to press against the inner Periphery of the tubular body. The extensions are connected to a drive handle mounted underneath a bail of the cap and cooperate with the at least one resilient member.

7 Claims, 3 Drawing Sheets

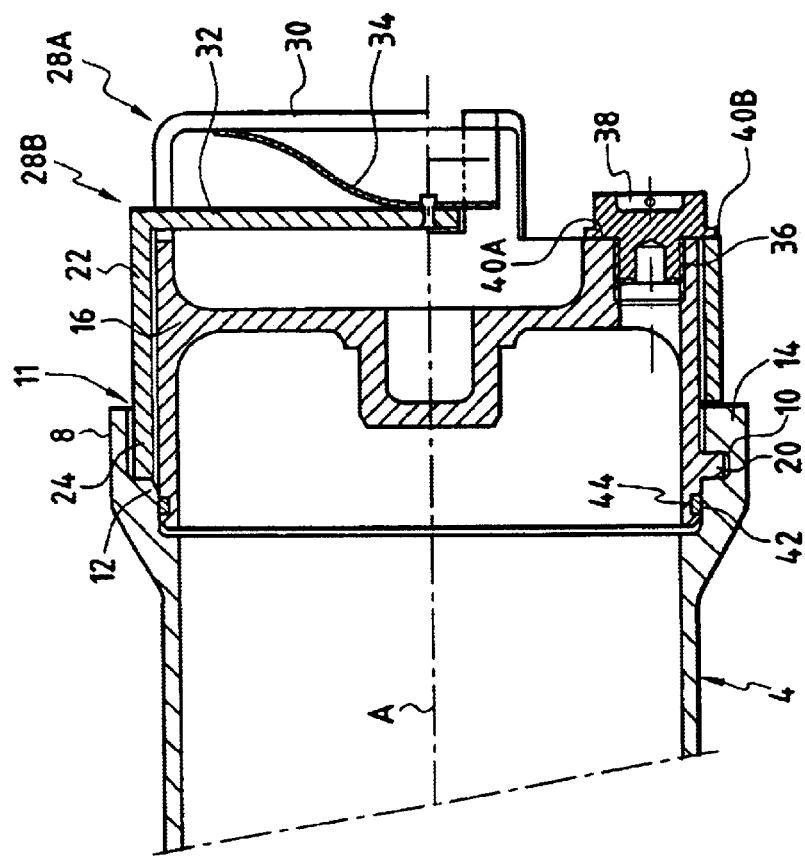
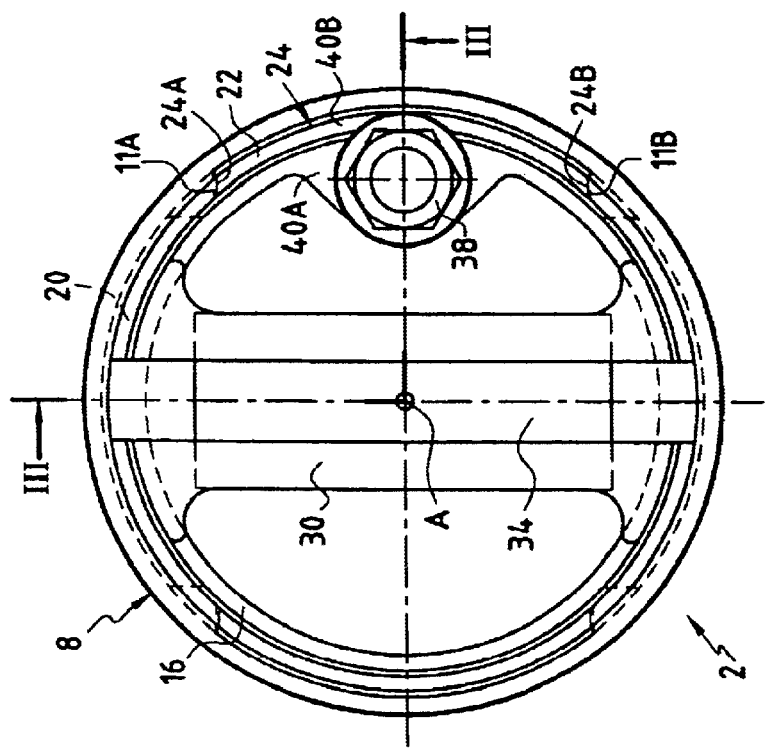
FIG.3
FIG.2

SEALABLE CASING HAVING A QUARTER-TURN CLOSING ARRANGEMENT

BACKGROUND OF THE INVENTION

The invention relates to a sealed casing for a fluid filter, including a tubular body having an orifice at one of its ends, a cap to tightly seal the orifice, and locking elements to lock the cap onto the tubular body.

In particular, the present invention relates to an aeronautical system for protecting an oil circuit or a circuit feeding fuel to a gas turbine engine. This circuit may require protection against any external contamination from a variety of contaminating sources in contact with the circuit, for example a storage tank or a pump, that might degrade and produce fluid-contaminating particles.

Sealed systems are known wherein sealing is implemented by assembling a casing and a cap with the use of screws and self-locking threads in the casing.

Such systems, however, require screwing or unscrewing the screws during maintenance operations, in particular to change the filter, and therefore entail time-consuming labor. Moreover, repetition of cap assembly or disassembly over time degrades the fastening of the self-locking threads so that the casing may need to be replaced.

SUMMARY OF THE INVENTION

The objective of the present invention is to present a sealed casing with a simpler cap assembly or disassembly and easier filter replacement, thereby reducing the shutdown time of a gas turbine engine when the engine maintenance undergoes procedures.

This objective is attained in the present invention through a clamping arrangement which includes at least one radial arcuate segment or member near or at a distal end of a cap that is arranged to slide into at least one clearance defined by a tubular body. The clamping arrangement further includes at least one locking element defined as an extension mounted in an axially displaceable manner on the cap and radially positioned between the at least one arcuate segment of the cap, each extension being configured to be received in an interstice positioned between the arcuate segments of the orifice and arranged to cooperatively secure the cap to the tubular body.

Due to the clamping arrangement, the cap is easily removed by simple rotation. When there are two male arcuate segments and two clearances in the cap and in the tubular body, the cap only needs to be rotated by a quarter turn in order to be clamped onto the tubular body or be released therefrom.

Advantageously, the extensions are biased towards the tubular body by at least one resilient element toward the locked position.

The extensions are elastically applied against the basic body when the cap is in the locked position such that the cap is prevented from rotating.

Advantageously, the clamping arrangement includes a bail.

The bail is positioned at a proximal end portion of the cap and allows gripping of the cap and thereby facilitates the affixation and rotation of the cap onto the tubular body.

Advantageously, the extensions are firmly joined to a drive handle situated near the bail.

Advantageously, the resilient elements are inserted between the bail and the drive handle.

In this manner, pressing the drive handle against the bail is sufficient to disengage the extensions.

Advantageously, the extensions and the drive handle are positioned on a hoop member concentric with the cap.

The hoop member allows configuring the extensions and the resilient elements on a single, easily manufactured structure.

Advantageously, the casing is furthermore fitted with a drain plug.

The drain plug is configured in such manner that it will prevent the cap from any axial displacement and the hoop member precludes any danger of premature disassembly.

Advantageously, sealing is implemented by an O-ring interposed between the orifice and the cap.

The O-ring may be housed in an annular groove in either the orifice of the basic body or in the cap, depending on the cap entering the orifice or enclosing it.

Other features and advantages of the invention are elucidated in the illustrative but non-limiting description below and in relation to the attached drawings.

BRIEF DESCRIPTION OF THE DRAWINGS

FIG. 2 is a topview of the closed, sealed casing, FIG. 3 is a partial view of FIG. 2 along III—III.

DETAILED DESCRIPTION OF THE INVENTION

Figure 1:
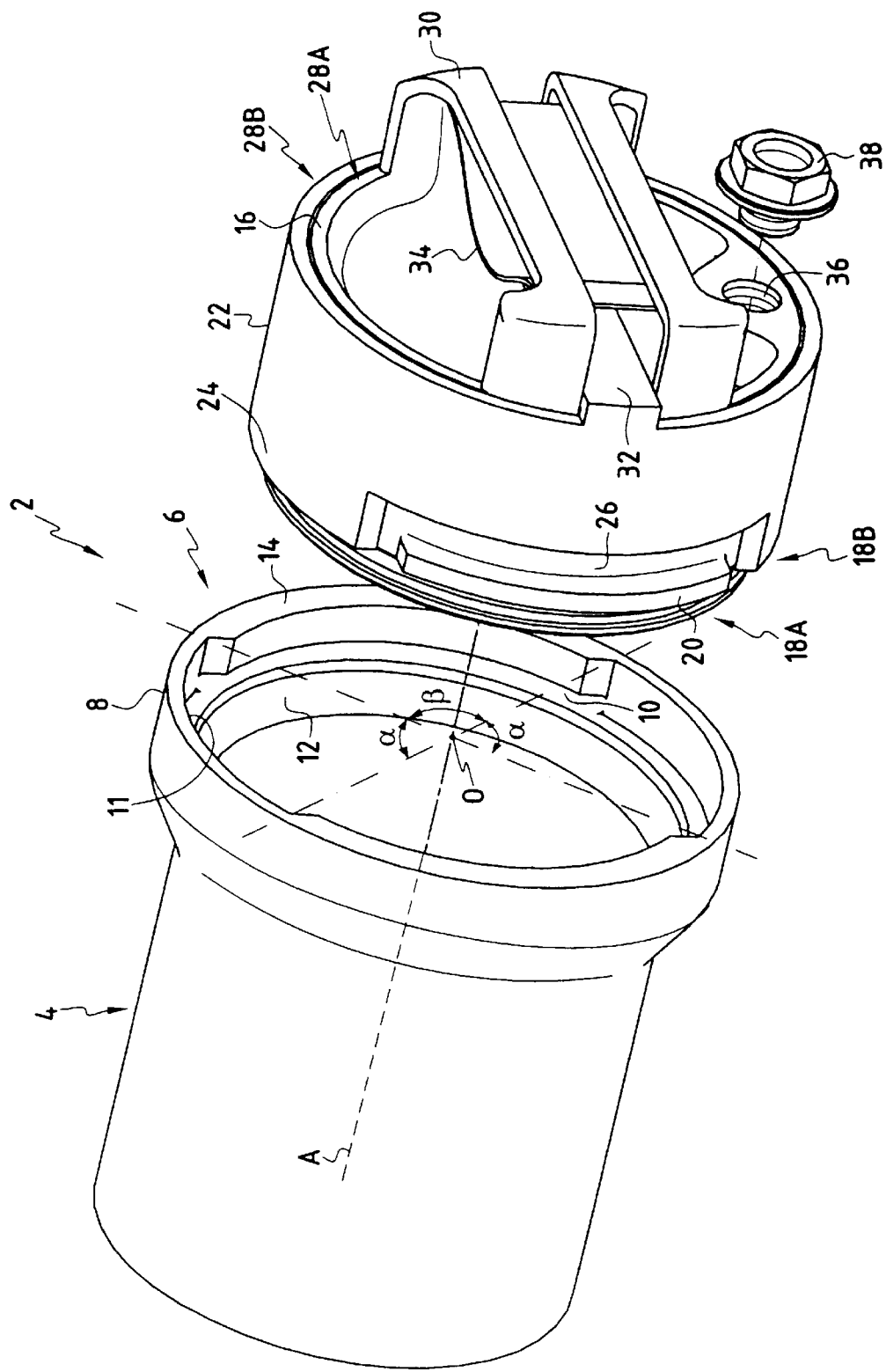
FIG. 1 is an exploded perspective view of the invention in a disassembled state.

FIG. 1 shows the present invention comprising a sealed casing 2 that may include a fluid filter such as an oil or fuel filter.

The sealed casing 2 comprises a tubular body 4 which is preferably cylindrical in shape with respect to an axis A and defines at a first end 8 an orifice 6 that may slightly flare. The orifice 6 is circular and concentric with the tubular body 4.

An annular clearance 10 exhibiting an inside diameter exceeding or equal to that of the orifice 6 is present along the inside surface of the orifice 6 between a circular shoulder 12 constituted in the orifice 6 and a male arcuate segment 14. In this embodiment, the sealed casing 2 comprises two diametrically opposite male arcuate segments 14 which are configured in the mouth of the orifice 6. These male arcuate segments are each in the form of an arc of a circle of which the center O is on the axis A, and each subtend an angle β preferably of 90°. Depending on the number of male arcuate segments 14, their subtended angle α will be different. The space between two adjacent male arcuate segments 14 constitutes an interstice 11 in the form of an arc of a circle having a center O and subtending an angle α preferably of 90°. The sum of the angles α and β is 360°. The diameter of the interstices 11 is substantially equal to that of the clearance 10.

FIG. 1 shows a cap 16 fitted at a first end 18A with two male arcuate segments 20 of which the center O' is on the axis A and which subtend with respect to the axis A an angle less than or equal to the angle α. The sealed casing 2 is provided with a hoop member 22 that is concentric with and encloses the cap. At a first end 18B, the hoop member 22 is provided with two arc-of-circle extensions 24 of which the center O' is on the axis A and subtends with respect to it at an angle equal to or less than the angle α. The extensions 24 are arranged to cooperate with interstices 11.

The hoop member 22 and the cap 16 are configured in such a way that the extensions 24 are positioned between the male arcuate segments 20. The space between the end 18A of the hoop member 22 and the male arcuate segments 20 subtend clearances 26 which slide over the arcuate male segments 14 of the tubular body 4.

The cap 16 and the hoop member 22 respectively include a bail 30 and a drive handle 32. An elastic blade 34 is mounted between the bail 30 and the drive handle 32.

The cap 16 includes a threaded opening 36 which cooperates with a sealing drain plug 38 whereby the hoop member 22 can be kept axially in position relative to the cap 16.

FIG. 2 shows the casing 2 with assembled cap 16 in the locked position, the sealing drain plug 38 is screwed into the threaded opening 36 until it makes contact with the front surfaces 40A and 40B respectively of the cap 16 and the hoop member 22.

To close the sealed casing, a user removes the drain plug 38 and seizes the cap 16 by the bail 30 by moving the user's fingers underneath the drive handle 32 and holding the cap in such a way so that the male arcuate segments 20 are positioned opposite the interstices 11.

In this position, the extensions 24 are positioned opposite the male arcuate segments 14 and accordingly it will be necessary to move the extensions 24 back toward the end 28A of the cap 16. For such purposes, the user depresses the drive handle 32 in a way to flatten the elastic blade and to shorten the distance between said drive handle 32 and the bail 30.

While keeping the drive handle 32 against the bail 30, the user is then able to axially slide the male arcuate segments 20 along the interstices 11. The user next must only pivot his hands by a quarter turn to pivot the male arcuate segments 20 into the clearance 10 and to thereby release the drive handle 32. In this manner, the elastic blade 34 is released and allows the extensions 24 to enter the interstices 11 and to come to rest against the shoulder 12. In this position, the sub-assembly of the male arcuate segments 20 and clearances 10 constitute a bayonet system which is kept irrotational by the extensions 24. In case of premature rotation, an end 24A and an end 24B respectively of each extension 24 comes to rest against an end 11A and an end 11B of each interstice 11, thereby trapping the male arcuate segments 20 of the cap 20 that are received in the clearances 10 of the tubular body 4 underneath the male arcuate segments 14 of the tubular body 4.

In order to preclude any axial slippage of the hoop member 22 relative to the cap 16, the drain plug 38 is screwed into the threaded opening 36 until it makes contact with the front surface 40A of the cap 16 and the front surface 40B of the hoop 22.

An O-ring 42 is shown in FIG. 3 and is inserted into an annular groove 44 preferably constituted in the periphery of the cap 16 near its end 18A.

Figure 4:
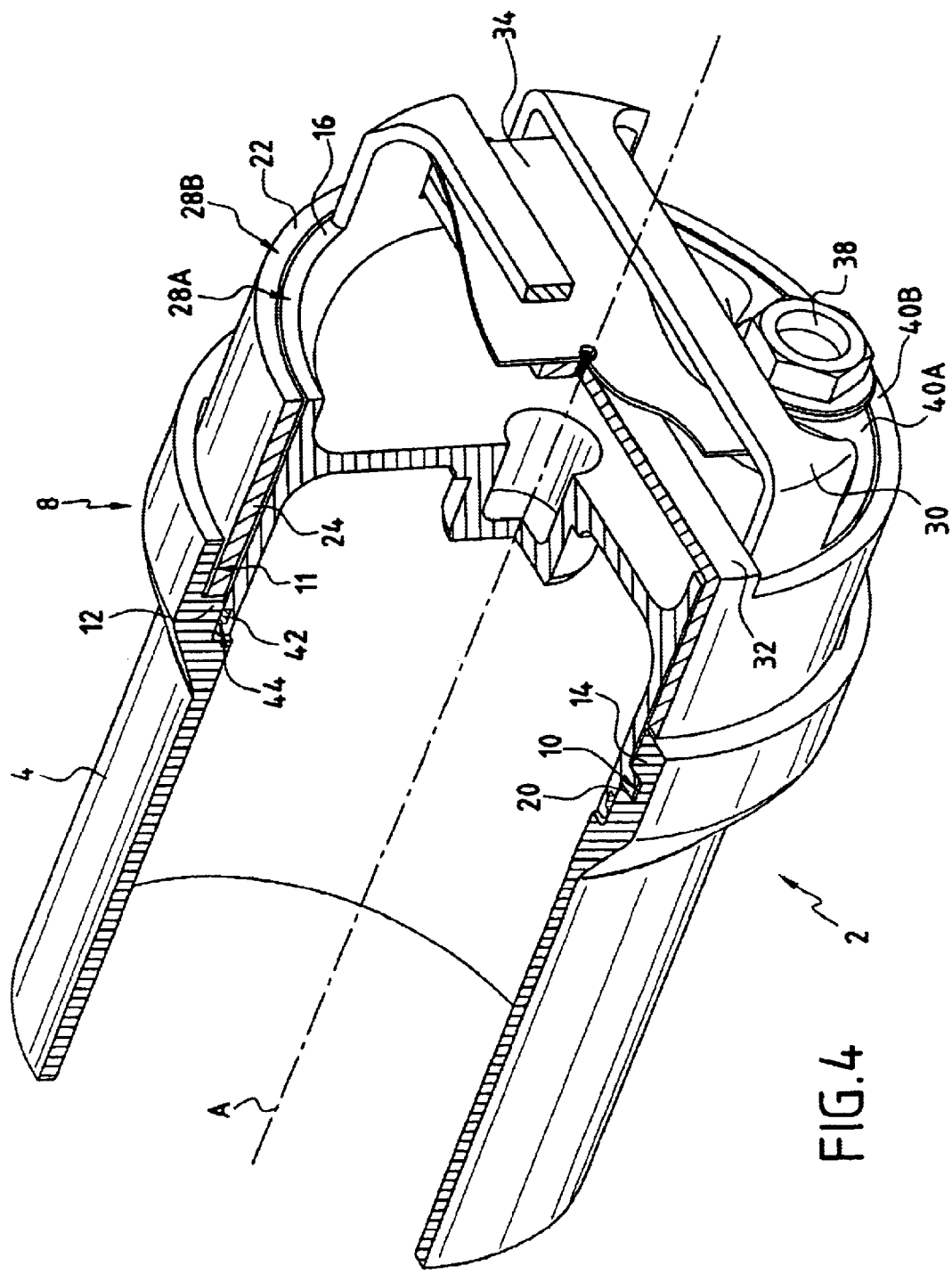
FIG. 4 is a partial cutaway perspective view of the sealed casing.

FIG. 4 shows the sealed casing 2 when the cap 16 is in a locked position.

To take off the cap 16, the user operates in reverse to the above assembly procedure. The user begins by unscrewing the drain plug 38 and pressing the drive handle 32 against the bail 30 to disengage the extensions 24 out of the interstices 11 and applying a quarter turn to remove the clearances 20 from the interstices. Lastly, once the cap 16 has been entirely removed from the orifice of the tubular body 4, the user may release the drive handle 32.

It will of course be appreciated that the invention is not confined to the particular embodiment described herein, but is intended to embrace all possible variations which might be made to it without departing from either the scope or spirit of the invention.

What is claimed is:

1. A sealed casing for a fluid filter, comprising a tubular body having a circular orifice defined at a first end, said tubular body defining along an internal periphery thereof a plurality of clearances and a plurality of annularly spaced arcuate members projecting radially inwardly towards a central axis of said tubular body;

a cap dimensioned and configured to seal the orifice of said tubular body, a first end portion of the cap defining along an external periphery thereof a plurality of annularly spaced arcuate members projecting radially outwardly from the central axis of the cap and a plurality of clearances, the arcuate members of the tubular body arranged to engage cooperatively with the clearances of said cap, and the arcuate members of the cap arranged to engage cooperatively with the clearances of the tubular body;

a hoop member concentrically covering the cap, the hoop member having a plurality of extensions axially extending therefrom and annularly juxtaposed between the arcuate members of the cap, each extension is selectively biased against an internal periphery of the tubular body so as to lock the cap to the tubular body; and at least one resilient element located on a second end portion of the cap arranged to bias the extensions against the tubular body.

2. The sealed casing as claimed in claim 1, wherein the second end portion of the cap includes a bail cooperating with the at least one resilient element.

3. The sealed casing as claimed in claim 2, wherein the hoop comprises a drive handle that is positioned near the second end portion of the cap and arranged to cooperate with the bail.

4. The sealed casing as claimed in claim 3, wherein said at least one resilient element is positioned between the bail and the drive handle.

5. The sealed casing as claimed in claim 1, further comprising a safety device axially securing the hoop member to the cap.

6. The sealed casing as claimed in claim 5, wherein the safety device comprises a drain plug configured to engage a threaded plug opening defined on the second end portion of the cap and secure against the second end of the cap and the hoop when positioned within said plug opening.

7. The sealed casing as claimed in claim 5, wherein a seal comprising an O-ring is interposed between the orifice and the cap.

* * * * *